SELF-LOCKING QUICK-RELEASING HUB

Filed Jan. 25, 1961 3 Sheets-Sheet 1

INVENTORS
NEAL B. COHEN
KURT SOTMAN

J. Donald Weber, Jr.
AGENT

INVENTORS
NEAL B. COHEN
KURT SOTMAN
J. Donald Weber, Jr.
AGENT

INVENTORS
NEAL B. COHEN
KURT SOTMAN

J. Donald Weber, Jr.
AGENT

United States Patent Office 3,124,319

Patented Mar. 10, 1964

3,124,319

SELF-LOCKING, QUICK-RELEASING HUB

Neal B. Cohen and Kurt Sotman, Philadelphia, Pa., assignors to Sperry Rand Corporation, New York, N.Y., a corporation of Delaware Filed Jan. 25, 1961, Ser. No. 84,885
16 Claims. (Cl. 242—68.3)

This invention relates to a hub. More particularly, the invention relates to a hub for mounting a reel which holds magnetic tape or the like.

In the past, tape reels which have been used in tape handling machines such as those found in digital computers have generally been mounted on the take-up or supply shafts in one of only a few ways. One such method of mounting comprises a "force-fit" mounting. In this mounting, a tape reel is fitted over a hub having a soft material, for example, rubber, on the surface thereof. After the reel is in place a face-plate is bolted on so that the soft material expands radially, thereby gripping the inner surface of the central opening in the reel to effect a coupling between the hub and the reel. By tightening the bolt, the firmness of the reel mounting may be increased so long as the soft material can expand. In addition, the face-plate maintains the reel on the hub.

In another method of reel mounting, a special reel having a serrated edge around its central opening is used. A latching piece, having a formed end, is fitted into one of the notches in the serrated edge to engage the reel for rotation. A spring loaded clip is locked into position to maintain the latching piece in its latched position and to hold the reel in place on the hub.

These types of reel mountings have many disadvantages. For example, the replacement time required for changing reels is relatively long and the reel changing operation is relatively slow. In addition, the notches and serrations must be properly aligned or the face-plate properly tightened in order to insure that the reels are engaged to operate properly.

These and other disadvantages are avoided or overcome by the tape reel hub which is the subject of this invention. According to one embodiment of this invention, there is supplied a hub which fits inside the central opening of the tape reel. The reel is held in place on the hub by movable jaws which include a gripping surface to engage the inner surface of the central opening of reel and provide the driving means between the hub and the reel. Moreover, the jaws include a lip which prevents the reel from slipping off of the hub. When it is desired to remove the reel, these jaws may be withdrawn from engagement with the reel by pressing upon a button at the front of the hub. Moreover, when the button is pressed, not only are the jaws withdrawn from the reel, but ejecting means are triggered whereby the reel is positively and forcibly ejected from its proper rotating and operating position. Furthermore, the triggering means also serve to lock the hub in its non-operating condition so that the jaws remain withdrawn whereby a new reel may be placed onto the hub. Conversely, when a reel is placed onto the hub the ejecting means displaced by the reel thereby releasing the trigger means and permitting the hub button to take the position it has when the hub is in its operating condition.

Consequently, an object of this invention is to provide a novel hub for reels.

Another object of this invention is to provide a hub which will facilitate the mounting and dismounting of tape reels used in tape handling equipment.

Still another object of the invention is to provide a hub which provides positive holding and positive ejecting actions to a reel at separate times.

A further object of the invention is to provide a hub which automatically assures proper reel positioning.

A still further object of the invention is to provide a hub which allows quick changing of reels.

These and other objects and advantages will become readily apparent when the following description is read in conjunction with the attached drawings in which.

*Description of Operation*

Figure 2:
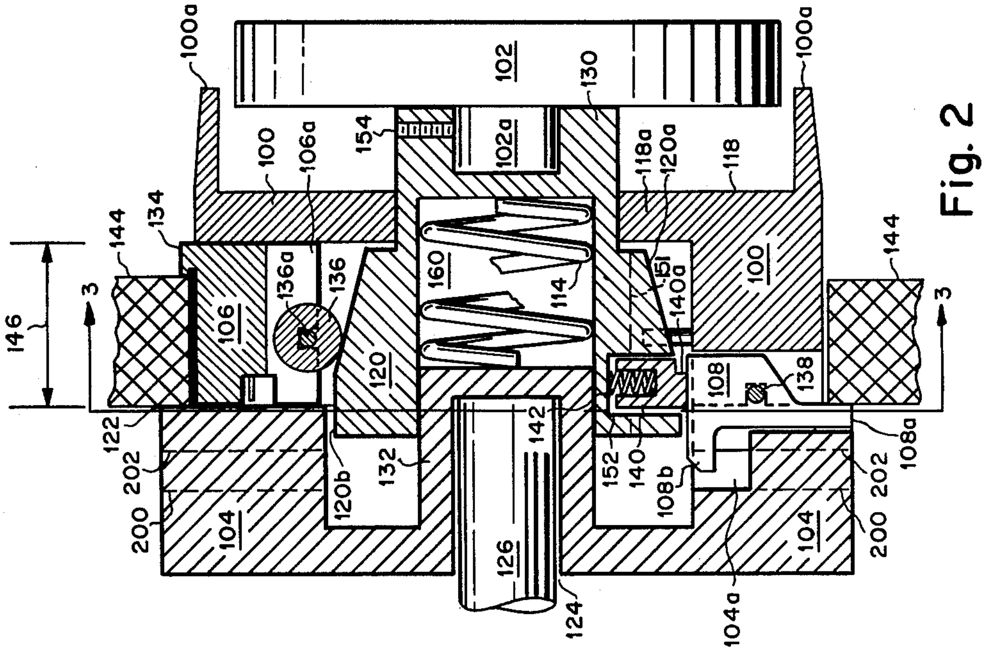
FIGURE 2 is a sectional side view similar to that of FIGURE 1 but with the hub shown in the operating condition with a reel locked thereon.
Figure 1:
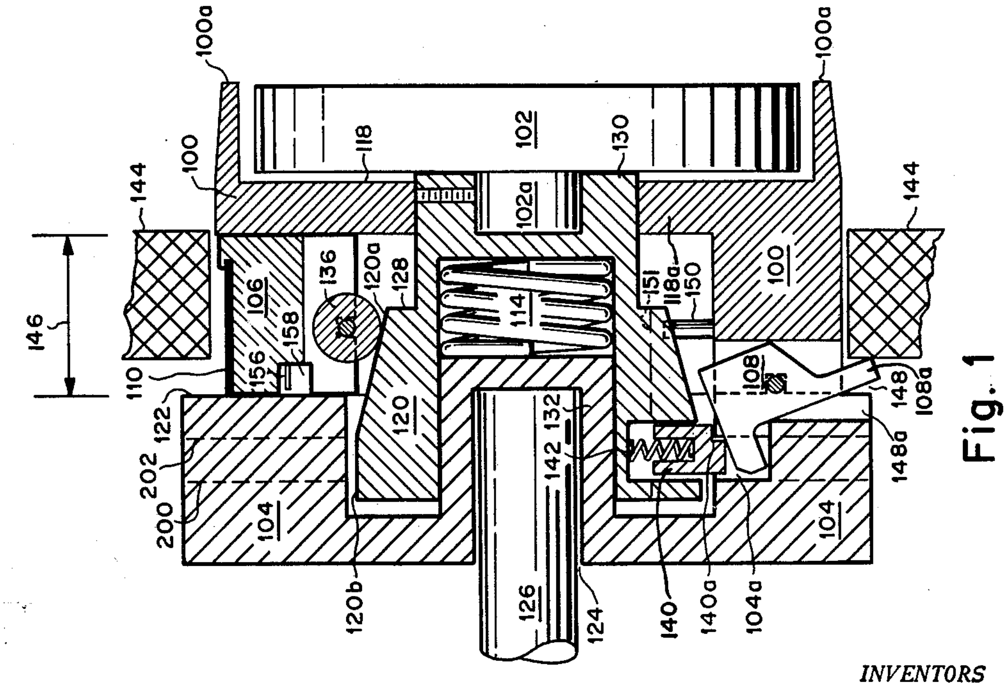
FIGURE 1 is a sectional side view of the hub in the non-operating condition with a reel partially mounted thereon and is taken along line 1, 2—1, 2 of FIGURE 3.

Generally, the hub, which is the subject of the invention has two stable conditions, viz. the operating condition as shown in FIGURE 2 and the non-operating condition as shown in FIGURE 1. To achieve the operating condition of FIGURE 2, a tape reel 144 is mounted on the hub by slipping it over the outer housing 100. Trigger prongs 108 are initially in the position shown in FIGURE 1. By pressing the reel 144 until it is adjacent backplate 104, the prongs 108 are forced back into the position shown in FIGURE 2. That is, prong ends 108*a* are pushed into their niches 148*a* in the back-plate 104, and trigger-prongs 108 pivot about axle 138. As the trigger 108 pivots, projection 108*b* (moves downwardly and) forces lock-pin 140 (against its spring load) into the lock-pin retaining opening 152 thereby releasing the locking action of pin 140 and permitting cam 120 to move forward. Cam 120 is urged forward by spring 114 which is located, under compressional force, within the central internal opening 160 of cam 120. As cam 120 moves forward, push button 102, which is connected to the cam by neck 130, is also moved forward toward the front end 100*a* of housing 100. Spring loaded cam 120 moves jaw 106 radially outwardly through jaw opening 146 bringing the holding surface 110 into contact with the inner surface of the central opening of reel 144.

Conversely, when, as shown in FIGURE 1, a reel 144 is already mounted on the hub (operating condition) and is to be removed therefrom (non-operating condition), push button 102 is depressed into housing 100 and cam 120 moves toward the back of the hub. As the cam 120 is moved into the housing 100, rollers 136 roll on the conical surface of the cam, and, due to the spring-loading thereof by leaf springs 156, jaws 106 retract into housing 100 through the jaw openings 146. With the retraction of the jaws 106, lip 134 is removed from in front of reel 144 and gripping or holding surface 110 is withdrawn from the inner surface of the central opening of reel 144. Thus, the reel is now free to be removed. Simultaneously, as cam 120 is urged toward the rear of the hub, lock-pin 140 reaches the location of projection 108*b* on trigger-prong 108. Since, at this point there is an enlarged opening 104*a* above the lock-pin 140, the pin is urged out of its retaining slot 152 by spring 142. As lock-pin 140 moves, it forces trigger prong 108 to pivot about axle 138 by pushing against projection 108*b*. When trigger-prong 108 pivots, end 108*a* rotates in an arcuate path around axle 138. The movement of end 108*a*, which rests adjacent reel 144 in the operating condition, forces reel 144 away from back-plate 104 and toward front end 100*a* of the hub whereby reel 144 may be readily removed by the operator of the apparatus utilizing the hub.

The hub is now in the non-operating or quiescent condition. Ledge 140a of lock-pin 140 is locked against an inner mating edge provided by the wall of back-plate 104 because the pin is spring loaded by spring 142; since pin 140 is locked, cam 120 cannot be returned to its original position (FIGURE 2) by spring 114.

*Description of Components*

Referring to FIGURES 1 and 2, a side view of the hub is shown in section. The external housing 100 of the hub is a component with a generally cylindrical exterior configuration. The outer diameter of the housing is determined by the inner diameter of the central opening in the reel 144 which is to be mounted thereon. For example, in the case of a tape reel 144 having a central opening with an inner diameter of three and one-half inches (3½″) the outer diameter of the hub would be substantially 3½ inches. Moreover, the housing 100 is approximately 2¼ inches front to back. The housing may be fabricated of cast aluminum or steel or in the alternative the housing may be a machined piece of material. The type of material will be determined by the operational requirements imposed by the rotational utilization of the hub-reel assembly; e.g. the angular acceleration requirements, etc. Thus, a lighter weight material may be desirable if the acceleration figure is high. In addition, consideration may be given to the ability to withstand frictional wear, as well as to cost, when the materials are specified. As shown in the figures, housing 100 may have a slightly tapered front end 100a. This tapered end is not necessary to the operation of the hubs, per se, but in a preferred embodiment thereof, the taper permits easier mounting of the reel onto the hub.

The housing 100 similarly has a generally cylindrical interior configuration. The cylinder wall may have a thickness of approximately ¾ inch at its back end. At its front end, the thickness of the cylinder wall, of course, decreases because of the preferred tapered configuration. In addition, depending upon the desired size of push button 102, the cylinder wall thickness may be further decreased, so long as there remains a stop surface 118 for push button 102 to abut against when it is depressed. Moreover, near the front end of the hub's internal cylindrical surface there is a shoulder 118a which acts as a stop for cam 120. Clearly, the stop surface 118 and the shoulder 118a may be comprised of a single section formed out of the cylinder wall thickness of housing 100.

In a preferred embodiment of the hub, the cylinder wall of housing 100 must be provided with six openings which extend through the cylinder wall of housing 100 and are preferably spaced at approximately 60° intervals around the periphery of the cylinder surface. These six openings include two different groups comprising three openings each. The three openings of each group should preferably have identical dimensions and be spaced at approximately 120° intervals around the periphery of the cylindrical surface of housing 100 such that the openings of one group alternate with the openings of the other group. The first group of three openings are the holding-jaw openings 146 through which holding-jaws 106 extend during operation of the hubs. Openings 146 must have dimensions which will accommodate a jaw 106, which has holding surface dimensions of approximately 1″ x 1″. The second group of three openings are the trigger-prong openings 148 each of which must accommodate a trigger-prong 108 during its operation. The trigger-prong is approximately 1⁄16″ x 3⁄16″ at the exterior end 108a, which end has an arcuate operational path so that the openings therefor must be approximately 1⁄16″ wide by ⅜″ front to back. The openings 148 mate with the niches 148a as described infra. Thus, the openings 146 for jaws 106 present three substantially square-shaped holes in the outer housing 100, and the openings 148 for the triggers 108 present three substantially slot-shaped holes in the outer housing 100 and extending from the back toward the front thereof. It should be clear that the number and/or the dimensions of the openings 146 and 148 may be varied in accordance with the number and size of the jaws 106 and/or trigger-prongs 108. For example, it may be desired to use more trigger-prongs and/or more holding jaws which would require more spaces substantially similar to those described but with smaller dimensions located around the housing 100; or it may be desired to use fewer of the jaw and/or trigger components and enlarge the dimensions thereof. However, the numbers and dimensions recited describe a preferred embodiment of the instant invention and are not limitative of the inventive principles set forth.

A back-plate 104 is connected to the outer housing 100 for example, by screws, which are omitted from the drawing for clarity. The back-plate is a circular disk-like component which provides a rear stop or abutment for a tape reel 144. Plate 104, in the illustrative example, may have an external diameter of about 4″ thereby providing a lip 122 of approximately ¼″ around the housing. Thus, when reel 144 is slipped onto the hub as previously described, it comes to rest at the rear retaining lip 122 and is properly positioned above the jaws 106. Moreover, the back-plate 104 preferably includes a central hole 124 into which a drive shaft 126 may be inserted. Thus, the back-plate 104 will provide a means for coupling the rotatable hub to the motor, for example, which drives the hub and the associated reel. In a preferred arrangement, the back-plate 104 is made separate from the housing 100 since this method of manufacture is much simpler. In addition, the plate 104 may be made of the same materials as housing 100.

In the fabrication of the separate back-plate 104, slotted openings or niches 148a should be provided which mate with the slotted trigger-prong openings 148 in housing 100. These slots 148a must be large enough to accommodate the exterior end 108a of the trigger-prong 108. The dimensions of these openings are, therefore, approximately 1⁄16″ x ¼″. These openings provide a niche for the trigger prong end 108a to reside in when the hub is in its operating condition and the prongs 108 are not in operation. As in the case of the trigger-prong openings, the number of niches 148a is flexible (so long as there is one per trigger-prong 108) and in the preferred embodiment there are three of these niches.

In addition, back-plate 104 should include a centrally located raised portion 132 on the inner surface of the plate. This raised portion, in addition to providing a better means for coupling the motor shaft 126 to the hub, also provides an abutment for cam spring 114, as discussed subsequently.

Still referring to FIGURES 1 and 2, the cam 120 is mounted inside the outer housing 100 with one end of the cam attached to push button 102 by means of stem 102a. For example, the stem 102a of push button 102 is inserted into an open end of neck 130 of cam 120 and retained by means of a set screw 154 for example. As shown, the cam 120 has a generally conical configuration. A ledge 128 is provided around the periphery of the cam for abutting against the inner surface of shoulder 118a. The neck 130 of cam 120 which is attached to push button stem 102a extends through the shoulder 118a which may actually be circular in configuration. Neck 130 is, for example, approximately 1″ long so that the neck extension beyond shoulder 118a is about ¾″ thereby permitting a ¾″ travel of push-button 102 and cam 120.

The cam 120 should have a conical or similar tapered configuration according to the basic premise of the invention. Again, the exact dimensions are not critical, but in the preferred embodiment described, the overall length of the component comprising cam 120 and neck 130 may be approximately 2″. Moreover, the outside diameter of the base of the conical cam 120 may be about 2″ while the neck 130 has a 1¼″ outside diameter.

Since, as previously noted, the neck 130 has a length of about 1" from ledge 128, and ledge 128 should be about ⅛" to ¼" wide to assure proper abutting against shoulder 118*a*, the conical surface of cone 120 will make an angle of about 15° from the center line of the cam. Clearly, any or all of these dimensions may be altered in order to provide preferred embodiments without departing from the basic concept of the invention.

The cam 120 is, moreover, substantially hollow. That is, a central opening 160 may be drilled (or molded) into the cam. This opening extends from the base of the cam 120 toward (and possibly even into) the neck 130 and may be about 1" to 1½" long. The inside diameter of the opening 160 (which need not be circular in configuration) should substantially correspond to the outside diameter (or dimensions) of the raised portion 132 of back-plate 104. Then, if the raised portion 132 is made about ⅞" or more high, it will project about ⅛" into the central opening 160 of the cam 120 even when the cam ledge 128 rests against shoulders 118*a*. Thus, the raised portion 132 may incidentally provide a guide for cam 120. More importantly, a coil spring 114 is positioned within the central opening 160 of the cam 120. This spring 114 is inserted such that it is under a compressional force of several pounds between the central raised portion 132 of back-plate 104 and the end of the central opening 160 in cam 120. For example, the compressional force may vary between 6 and 13 pounds depending upon the position of the cam 120. By providing the compressional force on the spring, the cam 120 and push-button 102 are maintained in a spring-loaded condition so that push-button 102 resides in a position as shown in FIGURE 2 when the hub is in the operating condition. In the extreme case, cam ledge 128 abuts against the inner surface of shoulder 118*a*, and the inner surface of push-button 102 is spaced away from abutting surface 118 by a distance substantially similar to the length of cam-neck 130. Normally, however, cam ledge 128 will be spaced about ⅛" or more from shoulders 118*a* due to a restraint caused by the wedge-like action of roller 136 between cam 120 and jaw 106 which is forced against the inner surface of the opening in reel 144. Moreover, after the push-button 102 is pressed (see FIGURE 1) spring 114 will exert a force which tends to replace the button 102 and cam 120 to their respective operating positions (see FIGURE 2) but for the restraint supplied by pin 140 as described subsequently.

In addition to the guide provided for cam 120 by the central raised portion 132 of back-plate 104, there is provided in the interior of housing 100 a fixed key 150 which mates with a slot 151 (shown dotted) in cam 120 to produce a guide for cam 120 as it moves. Moreover, this key arrangement permits easier and surer alignment of the trigger-prongs 108 and lock-pins 140. The key 150 may comprise an elongated spline-like section which projects from the inner surface of housing 100, or in the alternative, key 150 may merely comprise a pin which projects from the inner surface of housing 100 as shown. The key 150 should be so positioned in the housing 100, that the key and the guide slot do not become disengaged when cam 120 is being moved either by push-button 102 or spring 114. This can generally be achieved by locating the key 150 near the middle of the housing 100.

In FIGURES 1 and 2 there is shown (at the top of the figures) a holding-jaw 106. The jaw 106 may be fabricated of aluminum or plastic, for example, and may be considered as having a generally cubic configuration. That is, the jaw has holding surface dimensions of 1" x 1", as previously indicated, and a depth of approximately ¾". In addition, there is a lip 134 which extends about ⅛" about the holding surface 110 of the jaw 106 which faces the exterior of the hub. The lip 134 is preferably fabricated as a part of the jaw 106 to form a unitary component. Thus, a jaw 106 may be molded with lip 134 in place or a portion of one surface of jaw 106 may be milled or machined thereby to provide the lip 134. The purpose of lip 134 is to act as a stop for holding a tape reel onto the hub and to positively prohibit the reel from moving forward off the hub during operation of the overall hub assembly as a part of a tape utilizing apparatus.

A layer or pad 110 of resilient material, for example cork or rubber, is located at the surface of jaw 106 which is adjacent the inner surface of the central opening of tape reel 144. This layer 110 of resilient material serves to grip the tape reel 144 thereby to provide the means for transferring the rotational energy from the hub to the reel 144. As will be seen subsequently, cam 120 applies a force via roller 136 and jaw 106 which ensures a tight friction grip between the pad 110 and the inner surface of the central openings of tape reel 144. In the event that the hub is to be used with a reel having a serrated edge, the pad 110 may have a corrugated configuration in order to permit positive engagement of the reel and the hub.

Roller 136 is a circular disc which may be fabricated of aluminum or plastic for example, or, in the alternative, may actually be a standard roller bearing. The roller is mounted on an axle 136*a* which passes through the center thereof. The roller 136 is located in a groove which is molded or milled into the interior end 106*a* of jaw 106 and the axle 136*a* is mounted in the walls of the groove. In a preferred embodiment, the groove is about ½" wide and about ⅜" deep. By using a roller having a diameter of about ½" and mounting the axle ⅛" into the groove, there will be approximately ⅛" (in the radial direction) of the roller protruding beyond the end 106*a* of jaw 106. Jaw 106 is spring loaded by spring 156 (see FIGURE 3) so that the protruding portion of roller 136 rests upon and rolls on the conical (or tapered) portion of cam 120 as cam 120 is moved by push button 102 or spring 114. Clearly, the position of jaw 106 is, therefore controlled by the roller 136 on the cam 120 as well as the spring 156. In an alternative embodiment (not shown), the roller 136 may be eliminated. In this embodiment the jaw 106 may actually have a wedge-shaped internal end which rides on the tapered surface of cam 120 whereby relative motion, similar to that previously described, will be produced between these elements.

Still referring to FIGURES 1 and 2, the trigger-prongs 108 are generally planar components which may be fabricated of steel, or the like. Each trigger-prong 108 has a generally rectangular configuration with two coplanar projections extending therefrom. These projections are: (1) trigger-prong exterior end 108*a* which extends from the upper left-hand corner of the rectangular trigger-prong 108 and beyond the outer surface of housing 100; and (2) trigger-prong projection 108*b* which extends from the lower left-hand corner of the rectangular trigger-prong 108 and into an open portion 104*a* in back-plate 104. A pivot axle 138 passes through the trigger-prong 108 and is substantially centrally located. This axle permits prong 108 to reside in the position shown in FIGURE 2, i.e. with prong-end 108*a* adjacent back-plate 104 in niche 148*a* when reel 144 is in place and the hub is in its operating condition. Similarly, when cam 120 is operated (as shown in FIGURE 1), trigger-prong 108 pivots about axle 138 and prong-end 108*a* moves away from back-plate 104 toward the front of the hub and thereby forces reel 144 off the hub. The position of each of the trigger-prongs 108 is, clearly, determined by the associated lock pins 140 which are in turn controlled by cam 120, or the presence of a reel 144.

The lock pins 140 which cause the pivotal rotation of the trigger-prongs 108 are located in trigger pin openings 152 in cam 120. Thus, there are as many lock-pin openings 152 (and lock pins 140) as there are trigger-prongs 108 and the openings 152 are aligned therewith. The alignment is assured by the previously described key 150 and its mating guide slot. Each lock pin 140 is substantially cubical in configuration and typical dimensions may be ¼" x ¼" x ⅜" with the long dimension extending into the lock pin opening 152 which may be about ½" deep, for example. It will be seen that the width of lock pin 140 is substantially larger than witdh of trigger-prong 108. This extra size permits the alignment tolerances of the trigger-prong, lock-pin combination to be relaxed somewhat. In addition, it provides a relatively large component piece which is more easily handled during manufacture and, moreover, better withstands the forces exerted thereon.

Lock-pin 140 has a central opening drilled or molded therein for receiving and maintaining spring 142. Spring 142 is mounted under a compressional loading force of about 3 pounds so that lock-pin 140 is spring-loaded and tends to try to move out of the lock-pin opening 152. However, in the operating condition (FIGURE 2) the lock-pin 140 abuts against the inner surface of housing 100 on either side of trigger-prong 108 and trigger-prong opening 148 and is thereby retained within the opening 140. The lock-pin 152 may actually abut against the inner edge of trigger-prong 108 in some cases. On the other hand though, when cam 120 is pressed toward the rear of the hub to achieve the non-operating condition (FIGURE 1), lock-pin 140 is forced back toward, and finally, into opening **104*a*. As lock pin 140 moves into opening 104*a* which is large enough to accommodate the lock pin, it bears upon the trigger projection 108*b* and pivots trigger-prong 108 around axle 138**.

In addition, lock pin 140 has a ledge **140*a* milled or molded in the upper-right hand corner. This ledge 140*a* acts as a stop when lock-pin 140 has moved out of its opening 152 to pivot trigger prong 108, and locks the pin in its extended position in opening 104*a*. The locking of ledge 140*a* in opening 104*a* then prevents cam 120 from being moved forwardly by spring 114 when the pressure is removed from push-button 102. This action also inhibits jaw 106 from projecting its lip 134 beyond the outer surface of housing 100**. Consequently, the hub is maintained in a condition which readily permits the mounting of another reel thereon.

In the event that a reel 144 is now placed onto the hub, it will be seen that trigger prongs 108 will be forced into the position shown in FIGURE 2. That is, prong ends **108*a* will be forced into the niches 148*a* in back-plate 104. As the prong ends 108*a* are so forced, prong 108 obviously pivots about its axle 138. This pivotal motion of the prong 108 necessarily produces a similar motion of projection 108*b*. The motion of projection 108*b* forces lock-pin 140 out of opening 104*a* and into its opening 152. When the pin 140 has been forced sufficiently out of opening 104*a*, the locking ledge 140*a* is released from engagement therewith, whereupon cam 120 is forced forward by spring 114 and jaws 106 are driven radially outward to engage reel 144. Thus, it may be seen that the trigger prongs 108, serve two functions, viz. the prongs 108 serve to (1) assist in the ejection of reels, like reel 144, from the hub and (2) release the lock-pin 140 from engagement with the abutting surface defined by opening 104*a*. Therefore, these prongs 108 may be considered to be trigger means (for triggering lock-pin 140) or ejecting means (for ejecting reel 144**).

Figure 3:
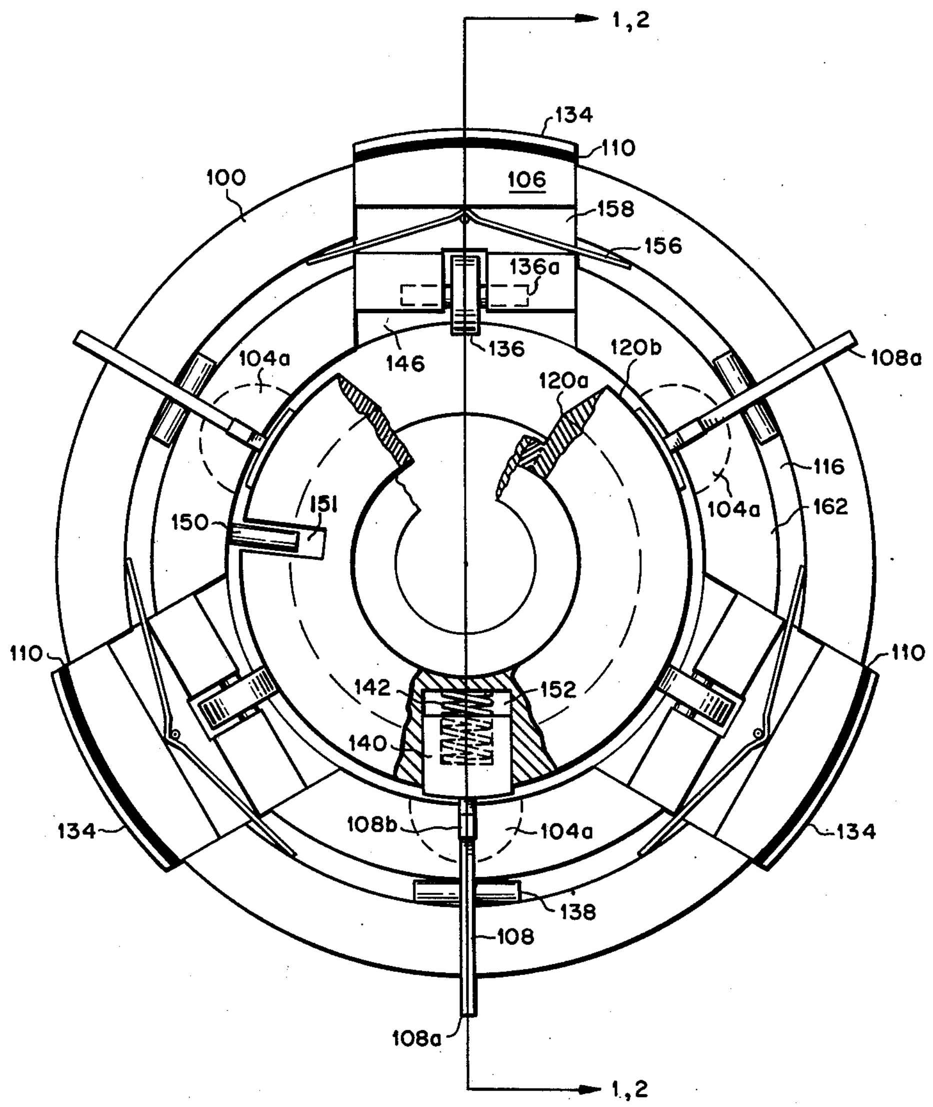
FIGURE 3 is a rear view of the hub with the back plate removed and is taken along line 3—3 of FIGURE 2.

Referring now to FIGURE 3, there is shown a rear view of the hub partially in section and with back-plate 104 removed. This view corresponds to a rear view of the hub in the operating condition a side view of which is shown in FIGURE 2. That is, jaws 106 are positioned such that lip 134 extends beyond the outer surface of outer housing 100 and trigger-prong exterior-ends **108*a* would reside in their niches 148*a* if back-plate 104 was in place. As may be seen, holding surface 110 of jaw 106 extends beyond the exterior surface of housing 100. This condition is achieved because it is assumed that reel 144 (not shown for purposes of clarity) has forced trigger-prong exterior-ends 108*a* back into their niches 148*a* thereby forcing lock-pins 140 back into opening 152 and releasing ledge 140*a* from the locked position with opening 104*a* (see FIGURE 1). Opening 104*a* is shown dotted in FIGURE 3 for purposes of explanation. This release of the lock-pins in turn releases cam 120 which, because of spring 114, is driven toward the front of the hub. As the cam moves forward, roller 136 rolls on the conical surface from location 120*a* to location 120*b* thereby forcing jaw 106 outward through its opening 146 so that jaw 106** locks the reel onto the hub.

Conversely, when push-button 102 is pressed, cam 120 moves toward the rear of the hub and roller 136 moves from location **120*b* toward location 120*a*. In order to insure that roller 136 remains in contact with cam 120 and jaw 106 is retracted, jaw 106 is spring-loaded by leaf-spring 156. Spring 156 may comprise a thin strip of spring steel or the like which is about ⅛" wide and about 2" long. Spring 156 is symmetrically mounted in a groove 158 in jaw 106 so that its ends project beyond the sides of jaw 106. These projecting ends extend into an annular groove 116 which may be milled or molded into the rear face of housing 100. Thus, when cam 120 moves toward the front of the hub (under the urging of spring 114) and jaw 106 is forced outwardly, spring 156 is caused to flex and thereby apply a restraining force on jaw 106. Moreover, when cam 120 moves toward the rear of the hub and the outward force applied to jaw 106 via roller 136 is removed, spring 156 urges jaw 106 back toward the center of the hub as roller 136 rolls on the conical surface of cam 120. Clearly, there are alternatives to the manner of spring-loading jaw 106, for example, spring 156 may be located in a hole drilled through the center of jaw 106**. However, these alternatives are all meant to be included within this description.

*An Alternative Embodiment*

Figure 4:
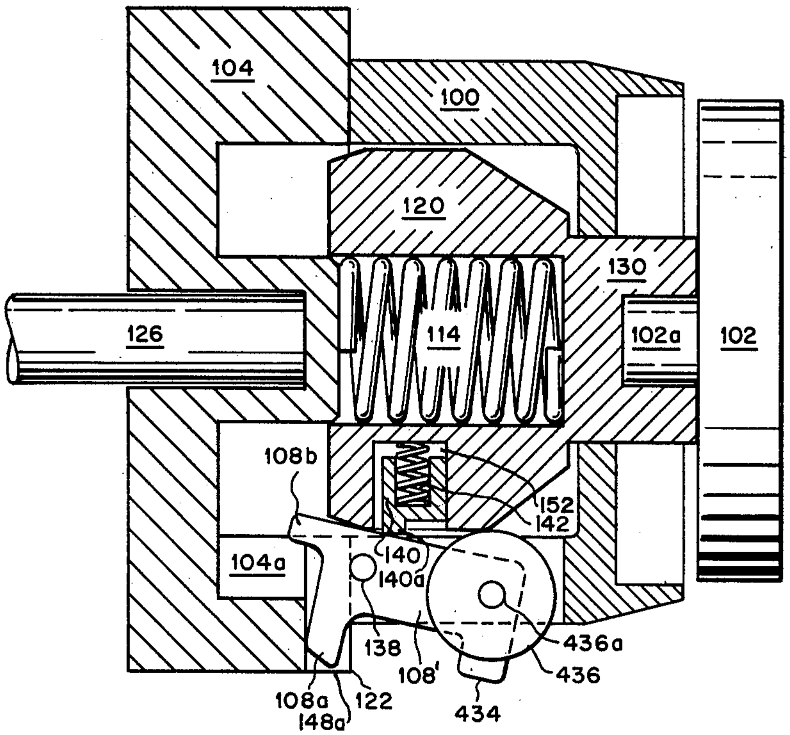
FIGURE 4 is a sectional side view of another embodiment of the hub.

Referring now to FIGURE 4, there is shown another embodiment of the instant invention. Elements in this embodiment bear reference numerals similar to those of similar elements in the preceding description. In addition, similar elements may be fabricated of similar materials and have similar dimensions. The modification proposed by the embodiment of FIGURE 4 provides for combining the trigger prongs 108' and the erstwhile jaws 106 into a single component. Thus, the basic concepts of the invention are similar to those discussed in relation to FIGURES 1–3. However, as shown in FIGURE 4, the main body of trigger prong 108' is extended to a length of about 1" in order to include lip 434. Also, in the area provided by the extension of the prong 108', an axle **436*a* is utilized to rotatably mount a disc 436 on the prong. This disc is substantially similar to disc 136. As shown in FIGURE 4, the hub is in its operating condition. That is, a tape reel (not shown) would be held in position between lip 434 and surface 122. Moreover, disc 436** provides a means for engaging a serrated central opening of the tape reel.

The operation of the hub in FIGURE 4 is substantially similar to the operation of the hub previously described. Thus, when push button 102 is pressed thereby to change the hub to its non-operating condition, the cam 120 is forced toward back-plate 104 against the force of spring 114. As locking pin 140 with its locking ledge **140*a* reaches opening 104*a* in back-plate 104, the pin 140 is moved by spring 142 such that the ledge 140*a* engages the opening 104*a* and locks cam 120 in the rearward position. At the same time, pin 140 bears against projection 108*b* and causes it to rotate about axle 138. As projection 108*b* rotates, trigger prong 108 is also rotated. Thus, lip 434 rotates about the axle 138 and is retracted into the housing 100 whereby the reel mounted on the hub is disengaged. Clearly, the disc 436 which is mounted on prong 108' adjacent lip 434 retracts into housing 100 along with lip 434. As prong 108' rotates and retracts the reel engaging elements, prong end 108*a*** also rotates about axle 138 and forces the reel away from the abutting surface 122 thereby ejecting the reel. Thus, a reel is ejected and the hub is locked in its non-operating condition simultaneously.

Conversely, when a reel is to be mounted on the hub and, therefore, the hub is to be placed in its operating condition, the prong 108' is made to rotate in the opposite direction. That is, a reel is slipped over housing 100 against prong ends 108*a*. The reel is then forced back until it abuts surface 122. When the reel abuts this surface, prong end 108*a* has rotated around axle 138 such that it now rests in its niche 148*a*. Clearly, projection 108*b* has now returned to the original position as shown in FIGURE 4 and trigger pin 140 is forced, against spring 142, into trigger pin opening 152 whereby trigger pin ledge 140*a* is disengaged from opening 104*a* and the cam 120 is released. The spring 114 thereby forces cam 120 along with push button 102 toward the front of the hub. As the cam 120 moves forward, the tapered surface thereof engages peripheral edge of disc 436. This disc rotates about its axis 436*a* and rolls along the tapered surface of cam 120 whereby the disc 436 is caused to move out of housing 100 and thereby into engagement with the reel mounted on the hub.

It may be seen, that the disc 436 may not be essential to the operation of the instant invention since lip 434 may adequately engage the reel. However, if the disc 436 is removed, the lip 434 should preferably be made in a wedge shape in order to better maintain the reel on the hub. Practically though the disc 436 is used in a preferred embodiment in order to provide the means for positively engaging a reel mounted on the hub. Furthermore, disc 436 provides positive engagement with at least one of serrations of the serrated tape reel which may be mounted on the hub. Moreover, it will be seen that since the disc 436 rotates as it rolls on the cam surface, it provides different locations of engagement with the tape reel whereby the wear on the disc is greatly reduced. As an alternative, the lip 434 may be eliminated since disc 436 can be shown to provide the necessary reel engaging and locating means.

By using the arrangement of this embodiment, it may be seen that the jaws 106 may be effectively incorporated with trigger prongs 108.' Since trigger prong 108' includes both lip 434 and disc 436 at its end, the number of openings in the peripheral surface of housing 100 may be reduced. However, these openings will now have dimensions necessary to accommodate the single component. These dimensions will produce a slot about 1/4" wide and 1 1/4" long. In a preferred embodiment, three trigger prongs with lips and discs attached thereto have been shown to operate effectively.

*Summary*

Clearly, the hubs which have been described are preferred embodiments, and minor revisions and changes may be made therein without departing from the spirit of the invention. For example, back-plate 104 may in actuality comprise two sections, viz. an actual back-plate 104 coupled to the motor shaft and bolted to the housing, and a median piece (shown between face 122 and dashed line 200) in the form of an annular ring which provides the locking place for the ledge 140*a* of trigger pin 140. Moreover, rear face of housing 100 may actually be defined by either of dashed lines 200 or 202, as shown in FIGURES 1 and 2, in order to permit easier assembling of the hub.

In addition, other materials may be used in one or more places in order to provide a lighter and less massive hub. For example, the holding jaws may be fabricated of a plastic and/or, the median piece mentioned above may be fabricated of Bakelite or plastic or the like.

Other changes of materials, designs or dimensions clearly may be made in order to provide a particular need in the specific utilization of the hub, for example, the actuating cam may be somewhat modified. It should be clear that the devices with these changes are meant to be included within this disclosure, as are similar hubs which utilize separate adaptors to provide for different size central openings in tape reels.

Having thus described the invention, what is claimed is:

1. A hub comprising a substantially cylindrical housing unit, a plurality of holding elements retractably mounted around the circumference of said housing unit, a plurality of trigger elements pivotally mounted around the circumference of said housing unit, said holding elements and said trigger elements being mounted in an alternating arrangement, and actuating means mounted within said housing unit and having two stable positions, said holding elements extending from said housing unit and said trigger elements assuming a first position when said actuating means is in a first stable position, said holding elements being retracted and said trigger elements assuming a second position when said actuating means is in a second stable position.

2. The combination of claim 1 including locking means mounted in said actuating means adjacent said trigger means, said locking means being adapted to bear against and cause said trigger means to pivot and assume said second position when said actuating means is in said second stable position, said locking means further causing said actuating means to be locked in said second stable position.

3. A hub comprising a housing unit, a plurality of first elements retractably mounted along the periphery of said housing unit, a plurality of second elements pivotally mounted along the periphery of said housing unit, actuating means mounted within said housing unit and having two stable conditions, said first elements extending from said housing unit and said second elements being in a first position when said actuating means is in a first stable condition, said first elements being retracted and said second elements being in a second position when said actuating means is in a second stable condition, and control means for determining the stable condition in which said actuating means resides.

4. The combination as called for in claim 3 wherein said actuating means includes locking means for maintaining said actuating means in one of said first and second positions.

5. A mounting hub for a tape reel comprising, a hollow cylindrical body member on which a tape reel may be mounted, a first plurality of openings in the peripheral surface of said body member, a movable jaw member fitted into each of said first openings and adapted for radial movement relative to the axis of said body member, a second plurality of openings in the peripheral surface of said body member, a movable trigger means fitted into each of said second openings and adapted for pivotal movement within said second openings, an actuating member axially located in said body member, said actuating member having an inclined cam surface associated therewith and engaging said jaw members, said jaw members being forced radially outwardly from the body member and into gripping position with the reel mounted on said body member when said actuating means is in a first position, means for urging said jaw members radially inwardly into said body member when said actuating means in a second position, said actuating member further comprising means carried thereby for locking said actuating member in said second position and adapted to be released by said trigger means when a reel is mounted on the hub.

6. A hub comprising a housing unit, a plurality of holding elements retractably extending from said housing unit, a plurality of trigger elements pivotally mounted in said housing unit, each of said holding elements being attached to a different one of said trigger elements, and actuating means mounted in said housing unit, said holding elements extending from said housing unit and said trigger elements being in a first position when said actuating means is in a first position, said holding elements being retracted and said trigger elements being in a second position when said actuating means is in a second position.

7. A mounting hub for a tape reel comprising, a hollow cylindrical body member on which a tape reel may be mounted, a plurality of openings in the peripheral surface of said body member, a movable jaw member fitted into each of said openings and adapted for radial movement relative to the axis of said body member, a movable trigger means fitted into each of said openings and adapted for pivotal movement within said openings, an actuating member axially located in said body member, said actuating member having an inclined cam surface associated therewith and engaging said jaw members, said jaw members being forced radially outwardly from the body member and into gripping position with the reel mounted on said body when said actuating member is in a first position, means for urging said jaw members radially inwardly into said body member when said actuating member is in a second position, said actuating member further comprising means carried thereby for locking said actuating member in said second position and adapted to be released by said trigger means when a reel is mounted on the hub.

8. In combination, a reel, a hub for mounting said reel thereon, and drive means for rotating said hub and said reel, said hub being coupled to said drive means, said hub comprising an external housing section, actuating means mounted internally of said external housing section, said actuating means including at least a portion thereof having a conical surface, spring-loaded jaw means mounted in close proximity to openings in said external housing section, roller means mounted at the internal surface of said jaw means, said roller means bearing upon said conical surface of said actuating means such that said spring-loaded jaw means retract into said housing section when said actuating means is in a first operative position and extend through said openings in said external housing section when said actuating means is in a second operative position, ejecting means pivotally mounted at further openings in said external housing section, and locking means mounted in said actuating means adjacent said ejecting means, said locking means being selectively operative to cause said ejecting means to pivot and eject said reel when said actuating means is in said first operative position.

9. A hub for mounting reels thereon comprising, an external housing section, actuating means mounted internally of said external housing section, said actuating means including at least a portion thereof having a tapered configuration, reel holding means mounted at openings in said external housing section, said holding means being spring-loaded such that said holding means retract into said housing section when said actuating means is in a first operative position, roller means mounted at the internal surface of said holding means, said roller means bearing upon said tapered portion of said actuating means such that said holding means extend through said openings in said external housing section when said actuating means is in a second operative position, means for ejecting reels from said hub, said ejecting means being pivotally mounted at further openings in said external housing section, and locking means mounted in said actuating means adjacent said ejecting means, said locking means and said ejecting means operatively connected such that said locking means causes said ejecting means to pivot when said actuating means is in said first operative position, said locking means including a locking portion for maintaining said actuating means in said first operative position.

10. A mounting hub for a reel comprising, a hollow cylindrical body member on which a reel may be mounted, movable jaw members fitted into openings in the peripheral surface of said body member and adapted for radial movement relative to the axis of said body member, means for urging said jaw members radially inwardly into said body member, an actuating member axially insertable into said body member, said actuating member having a cam surface associated therewith and engaging said jaw members whereby in one position of said actuating member said jaw members are forced radially outwardly from the body member and into gripping position with the reel mounted on said body member and operable in a second position to permit said jaw members to retract, trigger means pivotally mounted at further openings in the peripheral surface of said body member, and locking means mounted in said actuating means adjacent said trigger means, said trigger means being operative to cause said locking means to be released when said reel is in place whereby said actuating means assumes said one position.

11. A hub for mounting reels thereon comprising, an external housing section, actuating means mounted internally of said external housing section, said actuating means including at least a portion thereof having a tapered portion, reel holding means mounted at openings in said external housing section, said reel holding means being mounted such that said holding means retract into said housing section when said actuating means is in a first operative position, roller means mounted at said holding means, said roller means bearing upon said tapered portion of said actuating means such that said holding means extend through said openings in said external housing section when said actuating means is in a second operative position, trigger means pivotally mounted at said openings in said external housing section, and locking means mounted in said actuating means adjacent said trigger means, said locking means being operative to cause said trigger means to pivot and thereby eject a reel mounted on said hub when said actuating means is in said first operative position, said trigger means being operative to release said locking means so that said actuating means is in said second operative position when said reel is mounted on the hub.

12. A mounting hub for a reel comprising, a hollow cylindrical body member on which a reel may be mounted, a movable jaw member mounted at an opening in the peripheral surface of said body member and adapted for radial movement relative to the axis of said body member, means for urging said jaw member radially inwardly into said body member, an actuating member axially insertable into said body member, said actuating member having a cam surface associated therewith and engaging said jaw member whereby in one position of said actuating member said jaw member is forced radially outwardly from the body member and into gripping position with the reel mounted on said body member and operable in a second position to permit said jaw member to retract, trigger means pivotally mounted at an opening in said peripheral surface of said body member, and locking means mounted in said actuating means adjacent said trigger means, said trigger means being operative to cause said locking means to be released when said reel is in place whereby said actuating means assumes said one position.

13. A hub for mounting reels thereon comprising, an external housing section, actuating means mounted internally of said external housing section, said actuating means including at least a portion thereof having a tapered portion, reel holding means mounted at openings in said external housing section, said reel holding means being mounted such that said holding means retract into said housing section when said actuating means is in a first operative position, roller means mounted at said holding means, said roller means bearing upon said tapered portion of said actuating means such that said holding means extend through said openings in said external housing section when said actuating means is in a second operative position, ejecting means pivotally mounted at openings in said external housing section, and trigger means mounted in said actuating means adjacent said ejecting means, said trigger means being operative to cause said ejecting means to pivot and thereby eject a reel from said hub when said actuating means is in said first operative position.

14. In a hub for mounting reels thereon, an external housing section, actuating means mounted internally of said external housing section, said actuating means including at least a portion thereof having a conical surface, jaw means mounted in close proximity to openings in said external housing section, roller means mounted at the internal surface of said jaw means, said roller means bearing upon said conical surface of said actuating means such that said jaw means retract into said housing section when said actuating means is in a first operative position and extend through said openings in said external housing section when said actuating means is in a second operative position, the combination with ejecting means pivotally mounted at said external housing section, and control means mounted in said actuating means adjacent said ejecting means, said control means being selectively operative to engage said ejecting means thereby causing said ejecting means to pivot and eject a reel when said actuating means is in said first operative position.

15. The hub as called for in claim 14 wherein said jaw means and said ejecting means are integrally connected and are pivotally mounted at said openings in said external housing section.

16. A hub for mounting reels thereon comprising, an external housing section, actuating means mounted internally of said external housing section, said actuating means including at least a portion thereof having a tapered configuration, reel holding means mounted adjacent openings in said external housing section and operative to retract into said housing section when said actuating means is in a first operative position, roller means mounted at the internal surface of said holding means, said roller means bearing upon said tapered portion of said actuating means such that said holding means extend through said openings in said external housing section when said actuating means is in a second operative position, in combination with means for ejecting reels from said hub, said ejecting means being pivotally mounted in said external housing section, and means mounted in said actuating means adjacent said ejecting means adapted to cause said ejecting means to pivot when said actuating means is in said first operative position and thereby eject a reel from the hub.

References Cited in the file of this patent

UNITED STATES PATENTS

| | | |
|---|---|---|
| 576,677 | Kenworthy | Feb. 9, 1897 |
| 596,326 | Hawkins | Dec. 28, 1897 |
| 1,957,974 | Moreno | May 8, 1934 |
| 1,964,585 | Larsen | June 26, 1934 |
| 2,042,171 | Durand et al. | May 26, 1936 |
| 2,652,989 | Ripley | Sept. 22, 1953 |
| 2,709,051 | Bunch | May 24, 1955 |
| 2,733,874 | Petersen et al. | Feb. 7, 1956 |
| 2,747,809 | Selby | May 29, 1956 |
| 2,983,460 | Wright | May 9, 1961 |

FOREIGN PATENTS

| | | |
|---|---|---|
| 600,158 | Great Britain | Apr. 1, 1948 |

UNITED STATES PATENT OFFICE

CERTIFICATE OF CORRECTION

Patent No. 3,124,319 March 10, 1964

Neal B. Cohen et al.

It is hereby certified that error appears in the above numbered patent requiring correction and that the said Letters Patent should read as corrected below.

In the grant (only), name of second inventor, for "Kurt Stotman" read -- Kurt Sotman --; column 5, line 71, for "about" read -- above --.

Signed and sealed this 15th day of December 1964.

(SEAL)
Attest:

ERNEST W. SWIDER
Attesting Officer

EDWARD J. BRENNER
Commissioner of Patents